United States Patent [19]

Mattis et al.

[11] 4,401,842
[45] Aug. 30, 1983

[54] HEAT RECOVERABLE CLOSURE DEVICE HAVING CRACK PROPAGATION PREVENTION MEANS

[75] Inventors: John S. Mattis, Sunnyvale; Eleazar F. Ramirez, San Jose; Michael J. Vrcelj, Cupertino, all of Calif.

[73] Assignee: Raychem Corporation, Menlo Park, Calif.

[21] Appl. No.: 285,246

[22] Filed: Jul. 20, 1981

[51] Int. Cl.³ .......................................... H02G 15/18
[52] U.S. Cl. .............................. 174/71 R; 138/156; 174/DIG. 8
[58] Field of Search ............... 174/71 R, DIG. 8, 92; 138/156, 158; 403/273; 339/DIG. 1; 29/447, DIG. 35; 285/381

[56] References Cited

U.S. PATENT DOCUMENTS 3,455,336  7/1969  Ellis ............................ 138/156

Primary Examiner—A. T. Grimley
Assistant Examiner—D. A. Tone
Attorney, Agent, or Firm—Herbert G. Burkard; Douglas A. Chaikin

[57] ABSTRACT

A heat-recoverable closure device including a tubular member having an opening defining a means for readily communicating with articles disposed within the tubular member after heat-recovery. The closure device includes compression means attached adjacent and generally normal to each portion of the tubular member having an opening. The compression means further includes structure for maintaining it in constant compression during heat-recovery for preventing crack propagation.

11 Claims, 9 Drawing Figures

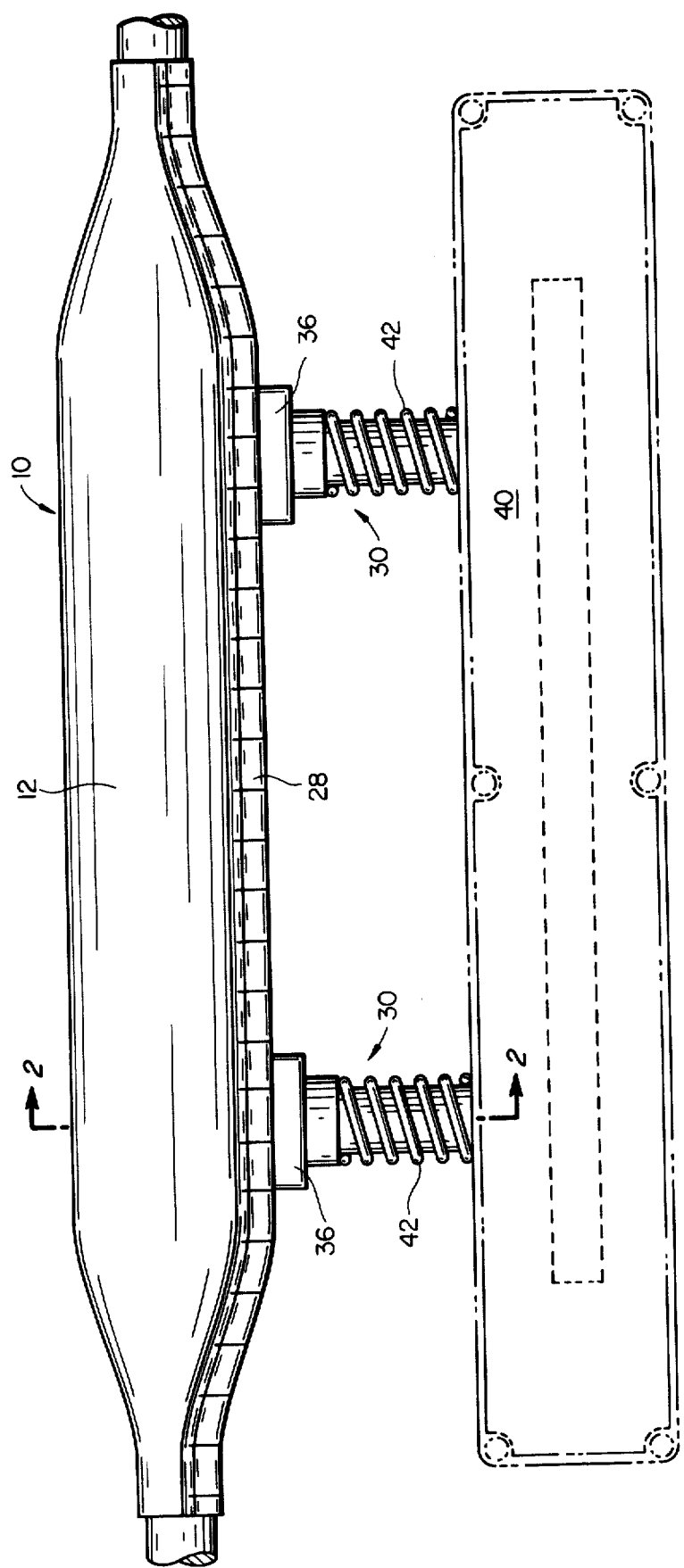

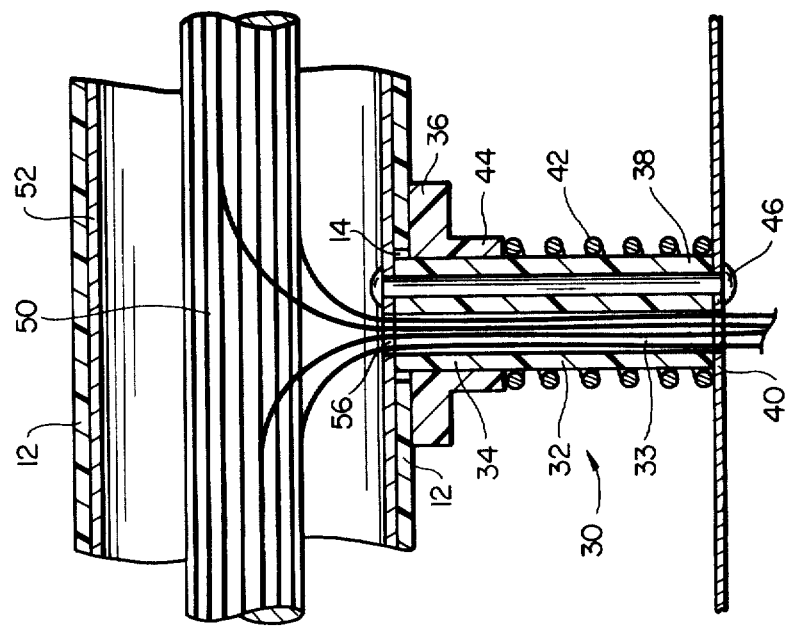
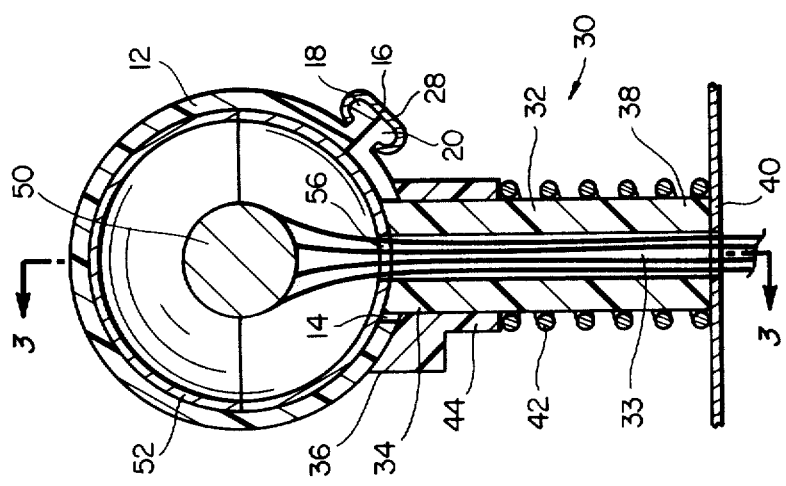

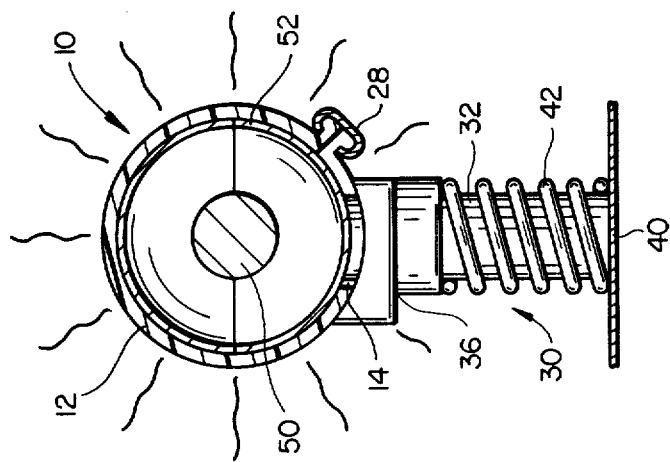
FIG_4C
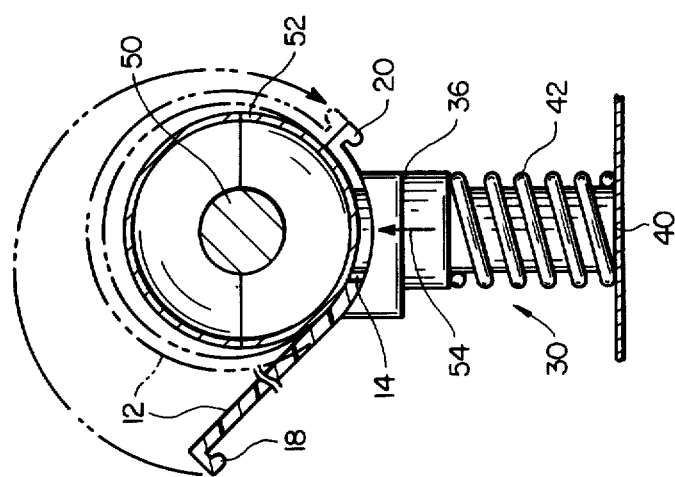
FIG_4B
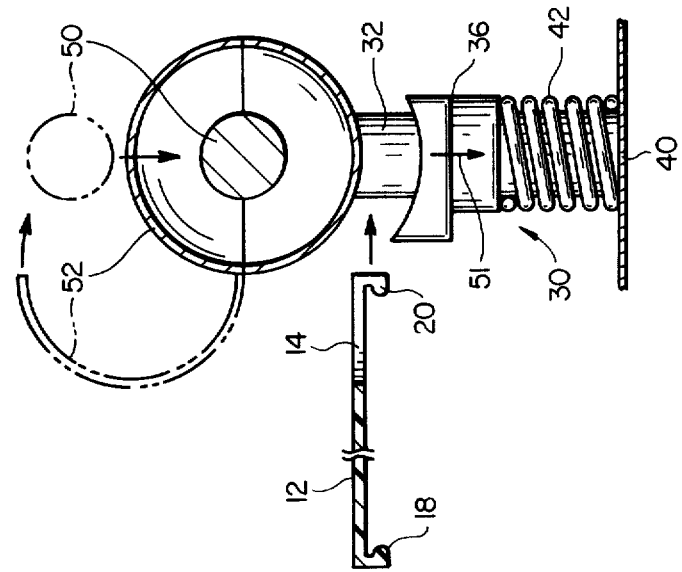
FIG_4A

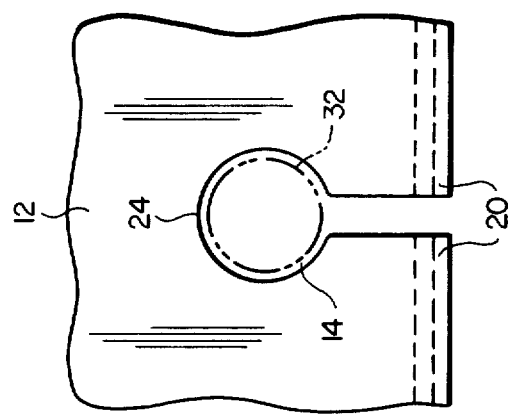
FIG_5C
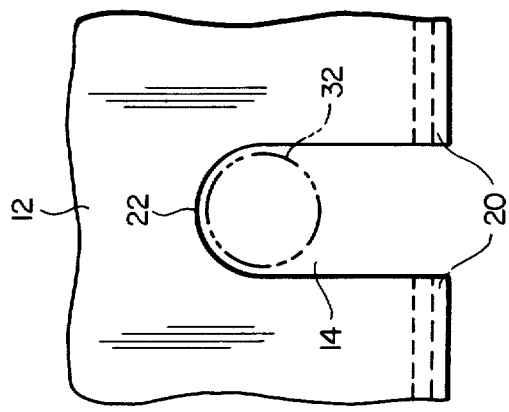
FIG_5B
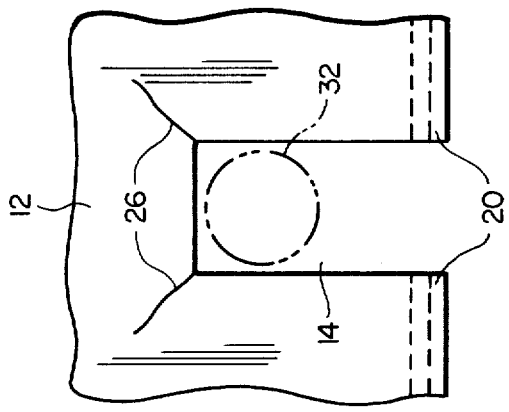
FIG_5A

HEAT RECOVERABLE CLOSURE DEVICE HAVING CRACK PROPAGATION PREVENTION MEANS

BACKGROUND OF THE INVENTION

This invention relates to heat-recoverable articles in general, and more particularly to heat-recoverable articles that can be positioned around cables, pipes, connectors or the like, wherein the articles disposed therein may be easily communicated with after heat-recovery.

Ellis, U.S. Pat. No. 3,455,336, describes a device for sealing, insulating or acting as a protective closure member for elongated objects such as cables, pipes or the like where the ends of the elongated objects are not accessible, or where it is undesirable to disconnect or otherwise displace them from their original position. A particular embodiment of Ellis includes a heat-recoverable article having a stem and a pair of communicating arms accommodating a branch-off between electric cables. This embodiment can be used for a branch-off from a main cable to provide access to the wires of the branch-off after installation of the closure member. However, during certain operations this structure proves cumbersome and in general does not offer the user a sufficiently flexible means of accessing the contents disposed in the article after heat-recovery.

As is quite well known in the art, one cannot make openings in heat-recoverable material without experiencing crack propagation during heat recovery. In the usual case, even a small nick or cut in the material results in splitting of a heat-recovered sleeve. Openings in heat-recoverable material cause a build-up of unresolved recovery forces. These forces build up quite rapidly due to the nature of the heat-recoverable material. As a result of this build-up crack propagation occurs causing the heat-recoverable material to split and consequently fail.

In the past, others have attempted to use a partially heat-recoverable tubular member which included a non-heat-recoverable portion immediately adjacent the opening. It was hoped that crack propagation would not occur during heat recovery because the immediate area surrounding the opening was not heat-recoverable. However, it was found that hot-spots developed causing crack propagation. In addition, such material is generally unreliable as well as expensive and difficult to manufacture.

Applicants herein have developed a heat-recoverable closure device including a heat-recoverable tubular member having at least one opening in the area where the member is heat-recoverable. The device further includes a compression means for preventing crack propagation caused by unresolved recovery forces around the opening. The compression means is attached generally normal to that part of the tubular member adjacent each opening and constantly maintained in compression during heat-recovery. The means thereby exerts a force generally normal to and radially against the tubular member for equalizing unresolved recovery forces on that portion of the member adjacent the opening, thereby preventing crack propagation during heat-recovery.

SUMMARY OF THE INVENTION

Applicants have invented a new closure device which may be used for enclosing and sealing communication wire splices, terminations, and the like. The device includes a heat-recoverable tubular member which may have unrecoverable portions. The member has at least one opening in the heat-recoverable portion of the tubular member defining a means for communicating with articles disposed in the tubular member even after heat-recovery. The device includes a compression means for preventing heat-recovery crack propagation due to said opening.

The compression means includes structure for attaching the means generally normal to that portion of the tubular member adjacent each opening. The compression means further includes structure for maintaining the means in constant compression during heat-recovery.

After attaching the compression means to the tubular member the sleeve may be recovered without crack propagation. The compression means exerts a continuous, radially inward, generally normal force against that portion of the member adjacent each opening. This compression force grips the member and balances the unresolved recovery forces caused by each opening, thereby preventing crack propagation.

In a preferred embodiment which is explained more fully hereinafter, Applicants' invention comprises a wrap-around closure device which is useful in aerial applications. In this embodiment, Applicants use a particular compression means embodiment which includes a means for holding the device without need of field craftsman, thereby freeing the craftsman's hands, and allowing him to concentrate on other tasks.

The compression means in various preferred embodiments may include a washer portion which is made of a plastic material and is curved so that it surrounds the opening in the tubular member. In one embodiment, the washer acts to seal the closure device and also functions as a thermal barrier which discourages hot spots and resultant crack propagation and failure.

The instant invention is relatively easy to manufacture and use. The instant invention has the additional advantage over prior devices of making the field craftsman more efficient. The invention includes a heat-recoverable closure device which has openings in the heat-recoverable portion of the heat-recoverable tubular member, thereby enabling the member to be a homogenous material. These and other advantages of the instant invention will become more apparent with reference to the accompanying drawing in which:

BRIEF DESCRIPTION OF THE DRAWING

FIG. 1 is a side view of one of the preferred embodiments of the closure device in accordance with this invention.

FIG. 2 is a cross-sectional view of the closure device of FIG. 1 taken along line 2—2 of FIG. 1.

FIG. 3 is a cross-sectional view of the closure device in accordance with this invention taken along line 3—3 of FIG. 2.

FIGS. 4A, B, and C are schematic illustrations of the steps of applying a preferred embodiment of the closure device in accordance with this invention.

FIGS. 5A, B, and C illustrate alternative means for readily communicating with articles contained in a closure device in accordance with this invention.

DETAILED DESCRIPTION OF THE INVENTION

With reference to the drawing wherein like reference characters designate like or corresponding parts throughout the several views, and particularly referring to FIG. 1, there is shown a preferred embodiment of the invention generally denoted by the numeral 10 representing a wrap-around closure device which may be used for enclosing and sealing telephone wire splices, terminations and the like. As will be explained more fully hereinafter, the device includes means for readily communicating with articles disposed in the closure device 10 even after the device has been fully closed and heat recovered. As will be appreciated, the heat-recoverable member could be a flat sheet as well as a tubular member.

As noted above, there are known closure devices which have included means for accessing articles contained therein. However such closure devices do not have openings in the heat-recoverable portions of the tubular member. The closure device in accordance with this invention comprises a heat-recoverable tubular member 12 which has at least one opening 14 in the heat-recoverable portion for readily communicating with wires and the like which may be disposed therein. Particularly, the preferred embodiment, may include a device where the entire tubular member 12 is heat-recoverable.

The preferred embodiment shown in FIGS. 1–3 is generally referred to as a wrap-around closure device having a rail and channel. A more detailed description of such articles can be found in R. H. Ellis, U.S. Pat. No. 3,455,336, the disclosure of which is incorporated herein by reference. As described in Ellis and is generally well known, the wrap-around closure device of this kind includes a ridge 16 extending along the length of the tubular member 12. The member may be longitudinally split along its length into two mating portions 18 and 20 respectively.

As described in Ellis, one of the mating portions of the ridge is usually of a larger size than the other. With reference to FIG. 5, it can be seen that Applicants cut a normally extending opening into the tubular member and through ridge portion 20 (in the preferred embodiment, the larger ridge), a predetermined distance. It has been found that the shorter this distance, the less the unresolved heat-recovery forces. Hence, Applicants attempt to minimize the size of the cut-out portion by heat barrier means, as will be explained more fully hereinafter. Further, Applicants prefer to use the modified cut-out portions shown in FIGS. 5B and 5C, i.e., U-shaped cut-out portion 22, or key-hole cut-out portion 24, respectively. These cut-out portions tend to minimize the unresolved heat-recovery forces, thereby tending to minimize crack propagation as compared with square cornered cut-out portion 26 shown in FIG. 5A. There are additional advantages gained by such alternative cut-out portions 22 and 24 which will be explained more fully hereinafter.

As can be seen in FIG. 2, the wrap-around closure device includes a fastening or closure means 28 for sliding over the ridge 16 and retaining the mating portions 18 and 20 in abutting relation during heat recovery, as is more fully explained in the Ellis patent, supra.

As set forth above, Applicants utilize a compression means to prevent propagation of heat-recovery cracks. A preferred embodiment of the compression means is shown in FIGS. 2 and 3 and generally designated by the numeral 30. In the preferred embodiment, the compression means comprises a stand-off 32 having an opening 44 extending from the distal end 34 through the proximal end 38. The compression means 30 includes a curved washer 36 slidably mounted at the distal end 34 of the stand-off 32. The curved washer 36 fits over tubular member opening 14 and has the dual function of insuring a tight closure between the compression means 30 and the tubular member 12 and as will be explained more fully hereinafter, acting as a heat barrier means. In the case where the heat-recoverable member is a flat sheet, the washer would of course also be flat.

The compression means 30 includes a spring means 42 slid over the proximal end 38 which holds the washer 36 against the tubular member 12. The compression means 30 includes a means for attaching the compression means between a terminator box such as 40 and the tubular member 12. In the embodiment shown in FIG. 3, the attachment means comprises a rivet 46 which extends from the distal end 34 to the proximal end 38 of the stand-off 32. As can be seen in the embodiment shown, the rivet 46 is connected to a splice case 52 which holds wires such as 50. The other end of rivet 46 extends through stand-off 32 and is adapted for connection with the terminator box 40. As can be seen, once the compression means is connected to the tubular member 12 through the splice case 52 and the terminator box 40, the spring 42 is held in constant compression, pressing the washer 36 against the tubular member 12 and insuring a tight fit for closure.

Additionally, the washer 36 may serve as a thermal barrier to prevent hot-spots and resultant crack propagation and failure. As will be appreciated more fully hereinafter, the washer 36 in this embodiment serves as a holding means which is important in aerial applications of this invention. In the case where the washer 36 functions as a thermal barrier, it is desirable to make the washer 36 of plastic material and preferably a flame retarded plastic material such as nylon, acrylic/PVC alloy, polyamide, and chlorinated polyvinylchloride. As will be appreciated by those skilled in the art of plastics, the stand off 32 should also be of such a material where it is desirable to have a thermal barrier.

Other alternatives of the compression means 30 are shown in FIGS. 2 and 3 where the washer 36 includes an enlarged end 44 which serves as a means for further compressing the spring 42.

As can be seen from FIGS. 2 and 3, wires 50 are joined in the splice case 52 and may then be fed through opening 14 and further through compression means 30 until reaching terminator box 40. In this manner, the contents 50 disposed in the closure member 10 can be readily accessed.

With reference to FIGS. 4A, B, and C, there is shown the schematic representation of the preferred method of applying Applicants' preferred embodiment of their closure device to an aerial telephone line splice or termination. Presuming an aerial line, user would in some manner climb to the aerial juncture desired. User would then move washer 36 in the direction shown by the arrow 51. The closure device 10 would then be moved into correct position against the stand-off 32 wherein the cut-out 14 would be positioned such that it contacts the stand-off 32 as shown. After positioning, the tubular member 12 is then wrapped around the splice case 52 or the like for sealing and enclosing articles disposed therein such as wires 50. As shown in FIG. 4B, the tubular member is fully wrapped about splice case 52 and fastened by sliding fastening means 28 over ridge 16, thereby retaining the mating portions of portions 18 and 20 in abutting relation during heat-recovery. Of course, after the tubular article has been secured to the stand-off 32, the washer 36 may be released and will be forced against that portion of the tubular member adjacent cut-out portion 14 in the direction shown by arrow 54 thereby releasing the field craftsman's hands for other tasks. It will be noted that the box mount terminator 40 has already been connected to the compression means 30 prior to this operation.

With particular reference to FIGS. 5A, B, and C, there are shown alternatives of the cut-out portion 14. As described earlier, it is preferable to have the cut-out portion curved in the manner shown so that stress cracks are not encouraged. Additionally, when the U-shaped cut-out portion 22 is employed, it allows easy installation and requires no preassembly. Under some circumstances, it may be desirable to apply a small amount of mastic or hot-melt adhesive or the like to the opening in order to effect complete closure of the wrap-around embodiment of the closure device.

Where it is desirable to use mastic or hot-melt adhesives or the like, the key-hole cut-out alternative 24 may become advantageous. The key-hole cut-out alternative also provides easy installation and preassembly is not required. Further, there is an added advantage in that the key-hole cut-out 24 shown in FIG. 5C does not allow the heat-recoverable tubular member 12 to be easily pulled from the stand-off 32 after the washer 36 has been released as described earlier. In this manner, using either of the embodiments shown in FIGS. 5B or 5C, the washer acting as a holding means, allowing the field craftsman to have both hands free for doing other work and concentrating fully on closing the device.

While the instant invention has been described by reference to what is believed to be the most practical embodiments, it is understood that the invention may embody other specific forms not departing from the spirit of the central characteristics of the invention. It should be understood that there are other embodiments which possess the qualities and characteristics which would generally function in the same manner and should be considered within the scope of this invention. The present embodiments therefore should be considered in all respects as illustrative and not restrictive, the scope of the invention being limited solely to the appended claims rather than the foregoing description and all equivalents thereto being intended to be embraced therein.

What is claimed is:

1. A closure device comprising:
    a heat-recoverable tubular member having at least one opening in the heat-recoverable portion of the tubular member defining a means for readily communicating with articles contained in the tubular member; and
    compression means attached generally normal to and adjacent each portion of the tubular member having an opening for preventing heat-recovery crack propagation, the compression means including means for maintaining the compression means in constant compression during heat recovery, exerting a continuous, radially inward, generally normal force against the portion of the tubular member adjacent each opening.

2. A wrap-around closure device comprising:
    a heat-recoverable tubular member having an integral ridge on the outer surface of the member, the ridge extending along the length thereof, and being longitudinally split along its length into two mating portions;
    the tubular member including means for readily communicating with articles disposed therein, the means comprising at least one opening in the heat-recoverable portion of the tubular member extending generally normally through one ridge mating portion defining a cut-out portion, the cut-out portion extending a predetermined distance in the tubular member;
    fastening means for sliding over the ridge and retaining the mating portions in abutting relationship during heat-recovery; and
    compression means attached generally normal to and adjacent each portion of the tubular member having an opening for preventing heat-recovery crack propagation, the compression means including means for maintaining the compression means in constant compression during heat-recovery, exerting a continuous radially inward force against the portion of the tubular member adjacent each cut-out.

3. The device as set forth in claim 1 or 2 wherein the entire tubular member is heat-recoverable.

4. The device as set forth in claim 3 wherein the tubular member has a pair of spaced-apart cut-out portions.

5. The device as set forth in claim 4 wherein the cut-out portions are U-shaped.

6. The device as set forth in claim 5 wherein the cut-out portions are key-hole shaped.

7. The device as set forth in claim 2 wherein the compression means has a distal end with a curved washer slidably connected thereto, the washer fits around and intimately contacts each cut-out portion, and the compression means has a proximal end which is connected to a box mount terminator and a spring means in compression is disposed between the box mount terminator and the washer and maintained in compression thereby.

8. The device as set forth in claim 7 wherein the washer comprises a heat-barrier means made from flame retarded plastic for preventing hot spots from forming on the tubular member portions adjacent each cut-out portion.

9. The device as set forth in claim 8 wherein the spring-loaded compression means comprises a columnar stand-off having an opening therethrough for feeding wires from one end of the stand-off to the other, the stand-off includes a distal end which mates with the curved washer, the curved washer having an opening extending therethrough for allowing wires to be threaded from the tubular member through the curved washer and into the stand-off, the stand-off having a proximal end connected to the box mount terminator and the spring means maintained in compression between the box mount terminator and the washer continually exerting a normal radially inward force against the portions of the tubular member adjacent each cut-out.

10. The device as set forth in claim 9 wherein the washer includes an enlarged end for further compressing the spring means between the box mount terminator and the enlarged end of the washer.

11. The device as set forth in claim 10 wherein the compression means is adapted to receive a rivet therethrough for holding the box mount terminator to a splice case.

* * * * *